May 2, 1967 K. F. WALLACE 3,317,713

ELECTRON BEAM READOUT SYSTEM

Filed Oct. 19, 1962

KURT F. WALLACE
INVENTOR.

BY Nathan N. Kallman

ATTORNEY

United States Patent Office 3,317,713
Patented May 2, 1967

3,317,713

ELECTRON BEAM READOUT SYSTEM

Kurt F. Wallace, Redwood City, Calif., assignor to Ampex Corporation, Redwood City, Calif., a corporation of California Filed Oct. 19, 1962, Ser. No. 231,646
4 Claims. (Cl. 235—61.11)

Figures 1, 2:
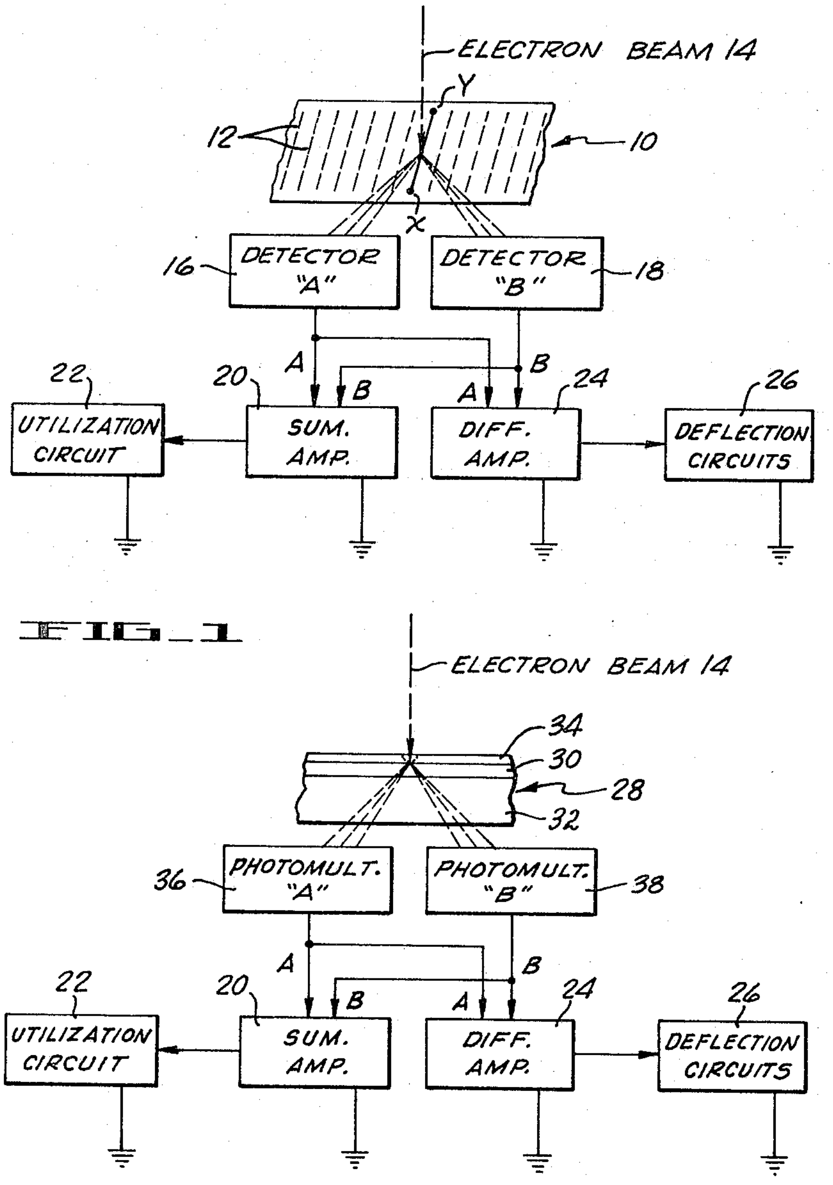

This invention relates to an improved electron beam readout system, and in particular to a readout system that affords accurate tracking of recorded information by a scanning electron beam.

It is highly preferable to employ an electron beam for reading out recorded information. High scanning speeds are possible with an electron beam, and therefore very high frequency signals may be read out thereby. Also, an electron beam with a controlled beam spot size can be utilized to scan very minute information areas or bits of a recorded medium that affords a high packing density.

In the data storage field, one major goal is to provide a system that is capable of processing wide bandwidth signal so that information signals in the ultra high frequency range, such as 50 megacycles per second and above for example, may be recorded and reproduced. Another major goal is to achieve high density recording and playback whereby a large amount of information may be processed while employing a minimum of storage space. In addition to these features, it is desirable to have good playback signal resolution as well as an efficiently operating system.

A known high density recording system that is adaptable to electron beam readout employs a transparency or a photosensitive film, such as described in copending U.S. patent application S.N. 212,546, filed July 26, 1962, entitled "Information Reproducing Apparatus," and assigned to the assignee of the present application. However, with the use of a transparent film, or any other storage medium having a high degree of packing density and that can be read out by an electron scanning beam, it is essential that each line of information be tracked accurately by the scanning beam so as to provide a maximum output of the recorded signal with a good signal-to-noise ratio and a minimum of distortion.

In known prior art systems, separate detection components and circuits are utilized to read out the information signal, and to develop tracking information for controlling the path or deflection of the electron beam. When operating with storage media or relatively thin films that have high packing density and are generally of small area, it is desirable to utilize a minimum of system components and circuits in association with such small area storage media.

An object of this invention is to provide an improved readout system that utilizes an electron beam for scanning the recorded information.

Another object of this invention is to provide an improved means for tracking the recorded lines of information with a scanning electron beam.

Another object is to provide a means for deriving an output signal from a recorded medium and for employing the same means to provide accurate tracking of the recorded information.

According to this invention, a readout system comprises a pair of detectors that sense the magnitude or intensity of the signal output derived from a storage medium, which is being scanned by an electron beam. The beam repeatedly scans the same path, which is substantially transverse to the longitudinal path of motion of the storage medium, and substantially coincident in length and direction to the transverse recorded tracks or lines of information. The detectors are located so that at all times each detector is spaced the same distance from any point along a predetermined scanning path. Each detector receives signal energy, representing the information stored on the medium, in response to the impingement of the electrons of the beam on such medium.

Whenever the beam is not accurately centered on the recorded track being scanned, the detectors sense signals of different magnitude. These sensed signals are directed to a difference amplifier to develop a difference or error signal. The error signal is applied to the beam deflection circuits, which act to deflect the beam towards the center of the track Simultaneously, the signals received by the detectors are added to provide a readout data signal representative of the information recorded on the storage medium.

The invention will be described in greater detail with reference to the accompanying drawings, in which:

FIGURE 1 is a diagram of the inventive system, showing a perspective view of a segment of a storage medium with an associated circuit in block form; and FIGURE 2 is a specific embodiment of the invention illustrated in FIGURE 1, employing a photosensitive storage medium of which a fragmentary view is shown in elevation.

Similar numerals refer to similar elements throughout the drawing.

In FIGURE 1, there is shown a portion of a storage medium 10, which may be a photosensitive film for example, that has information registered along closely spaced lines or tracks 12 that are disposed substantially parallel to each other across the medium 10. During the readout mode, a scanning electron beam 14, that is generated in a well known manner within an evacuated envelope (not shown) scans the tracks 12 of recorded information successively. The medium 10 is transported through the evacuated envelope at a substantially constant speed by known drive means, not shown in the drawing since such means are not necessary for the explanation of the invention. Upon impingement of the electron beam 14 on the storage medium 10, signal energy that is representative of the recorded signal at the discrete area being scanned is projected from the medium in a predetermined distribution pattern, as described in the aforementioned copending U.S. patent application S.N. 212,546.

The electron beam 14 scans the same path *x–y* repetitively across the moving medium 10 in a direction substantially perpendicular to the axis of the path of motion of the medium. When the beam 14 reaches the end of the path at point *y*, the beam is deflected from point *y* back to point *x* at the beginning of the scanning path. During this deflection period the beam 14 is blanked out so that no output signal is developed.

The speed of the moving medium 10 and the rate of beam deflection are correlated so that the beam 14 appears at point *x* substantially simultaneously with the appearance of the succeeding track of information at the path defined by points *x*—*y*. However, as a result of variations in speed of the medium 10, or nonuniform spacing of the recorded tracks 12, or other undesirable variations in the dimensions of the medium, the beam 12 may not be precisely centered on the track being scanned. Therefore, it is necessary to compensate for any offset or incongruity between the beam 14 and the scanned track 12.

In operation of the system of FIGURE 1, a pair of spaced detectors 16 and 18 is utilized to detect the signal energy that is distributed by the application of the scanning beam 14 across the medium 10 between points *x* and *y*. The detectors 16 and 18 are spaced equally from each point of application of the beam 14 along the scanning path *x*—*y*. The application of the electron energy to the medium 10 produces signal energy that is proportional to the information signal recorded at the elemental areas being scanned sequentially by the beam 14 as it progresses along the path $x—y$. However, if the beam is not accurately centered on the track 12, the signal energy that is passed to the detectors 16 and 18 will not be uniformly distributed, but will differ at the areas covered by the detectors 16 and 18.

If we designate the signal received by detector 16 as signal A, and that received by detector 18 as signal B, then the signal output that may be detected is $A+B$; whereas the tracking output is $A-B$. In accordance with this invention, signal A received by the detector 16 is added to signal B received by the detector 18 in a summing amplifier 20. The added signal $(A+B)$ representing the signal output from the medium 10, which in turn is indicative of the recorded signal, is then fed to a utilization circuit 22 for display or electrical readout, by way of example.

Signals A and B are also passed from detectors 16 and 18 to a difference amplifier 24 that generates a difference signal $(A-B)$, whenever the beam is not accurately tracking the line 12 of information, as represented by the difference in magnitude of the signals received at each detector 16 and 18. The difference signal or error signal is applied to deflection circuits 26 that act to correct the position of the electron beam 14, in a well known manner. The beam 14 is thus moved laterally relative to the path $x—y$ and is centered on the track 12 being scanned, following the track closely as it progresses across the medium 10. In this manner, maximum signal output is achieved and an improved signal-to-noise ratio is realized.

In FIGURE 2, a storage medium comprises a transparency 28 formed from a silver halide or photosensitive film 30 by way of example, supported by a transparent base 32, such as an optically clear plastic sold under the trade name Mylar. The information may be recorded on the film 30 by electron beam or optical means; if a Lippmann type emulsion layer is used, then recording is effected by means of a modulated electron beam. For the purpose of readout, as set forth in the aforementioned U.S. patent application S.N. 212,546, a plastic scintillator 34 is fixed on the photosensitive film 30.

The scintillator 34 is activated by electrons of the beam 14 and produces light radiation at the discrete or elemental areas being scanned. The light radiation is in a radial pattern and passes through the transparent and semi-transparent areas of the layer of film 30 and through the base 32. It is understood that no light penetrates the opaque elemental areas of the film 30.

In accordance with this invention, a pair of photomultipliers 36 and 38 are spaced equally from and on opposite sides of the line of the scanning path $x—y$ formed by the electron beam 14, and are disposed closely adjacent to the base 32. The photomultipliers 36 and 38 are energized in accordance with the light radiation received from the transparency 28 and generate electrical signals A and B for application to the summing amplifier 20 and the difference amplifier 24. Signals A and B are processed in the same manner as described with reference to the system of FIGURE 1, and proper tracking of the electron beam 14 along each line of information is provided, as well as readout of the recorded information.

It is to be understood that other storage media than those described above may be utilized to accomplish this invention. Also, tracking of a line of information that is recorded longitudinally, that is, in the same direction of travel of the medium, or of spirally recorded information, or of any spaced tracks of information are also contemplated as being within the scope of this invention.

Furthermore, a differential output signal such as derived in accordance with this invention may be used in a scanning electron microscope whereby physical deformations of the surface being scanned may be made to appear with greater contrast. Also, by utilizing such a differential effect, external noise is substantially reduced in the system.

There has been described herein an improved electron beam readout system wherein detection means provide accurate tracking by the beam as well as readout of the recorded signal.

What is claimed is:

1. A system for reading out information from a photosensitive medium having information recorded on tracks comprising:

means for directing an electron beam along a path in said medium for scanning the recorded tracks to produce signals therein which are related to the recorded information being scanned;

a pair of detectors, each detector of the pair being spaced on opposite sides of the path defined by the beam and equally spaced from such path to detect the signals produced by the beam impinging said medium;

means coupled to said detectors for adding the detected signals to provide a readout signal representative of the recorded information;

means coupled to said detectors for deriving a different signal representing the difference between the detected signals; and means for varying the path of the electron beam in response to such difference signal so that the beam substantially follows the center of the recorded tracks.

2. A system for reading out information from a photosensitive recorded medium comprising:

means for directing a readout electron beam repeatedly along a path in said medium for scanning the recorded tracks of such medium and for generating within the medium energy representative of the information signal on the recorded track being scanned;

a pair of detectors, each detector of the pair being equally spaced from the path defined by the beam to detect the magnitude of the signal energy generated within and distributed from the recorded medium;

means for adding the signals detected by such pair of detectors to provide an output signal representative of the recorded information;

means for deriving a difference signal representing the difference in magnitude between the signals detected by the pair of detectors; and means for employing such difference signal to deflect the path of the electron beam so that the beam substantially follows the center of the recorded track being scanned.

3. A system for reading out information from a recorded photosensitive film having a scintillator comprising:

means for diercting a readout electron beam along a path for scanning the recorded tracks of such film and for producing light radiation from within said scintillator which is representative of the information signal on the recorded track being scanned;

a pair of photomultipliers disposed at either side of recorded track for detecting the radiation produced from said scintillator and for developing electrical signals related to the detected radiation;

means coupled to said photomultipliers for adding the signals from each photomultiplier to provide an output signal representative of the recorded information;

means coupled to said photomultiplier for deriving a difference signal representing the difference between the signals developed by such photomultipliers; and means for employing such difference signal to deflect the electron beam along the track so that the beam substantially follows the center of the recorded track being scanned.

4. A system for reading out information from a recorded photosensitive film having a scintillator comprising:

means for directing a readout electron beam repeatedly along a path for scanning the recorded tracks of such film having such scintillator and for producing light radiation by secondary emission generated within the scintillator which is representative of the information signal recorded in the track being scanned;

a pair of photomultipliers, each photomultiplier being equally spaced from and on opposite sides of the path defined by the beam for detecting the radiation produced from within the scintillator and for developing electrical signals related to the detected radiation;

a summing amplifier coupled to said pair of photomultipliers for adding the signals from each photomultiplier to provide an output signal representative of the recorded information;

a difference amplifier coupled to the same pair of photomultipliers for developing an error signal representing the difference between the signals coupled to said photomultipliers; and means coupled to said difference amplifier for employing such error signal to deflect the electron beam so that the beam substantially follows the center of the recorded track being scanned.

References Cited by the Examiner

UNITED STATES PATENTS

| | | | |
|---|---|---|---|
| 2,461,667 | 2/1949 | Sunstein | 179—100.3 |
| 2,903,616 | 9/1959 | Schreiber | 250—217 |
| 3,124,790 | 3/1964 | Kuehler | 346—74 |

OTHER REFERENCES

Pederson et al.: Proceedings National Electronics Conference, volume 7, Feb. 15, 1952, pages 216–225.

MAYNARD R. WILBUR, *Primary Examiner.*

W. J. KOPACZ, *Assistant Examiner.*